(12) United States Patent
St. Arnauld

(10) Patent No.: US 6,756,129 B1
(45) Date of Patent: Jun. 29, 2004

(54) POLYMER BLEND COMPOSITIONS

(75) Inventor: Jean Caprice St. Arnauld, Charleston, SC (US)

(73) Assignee: MeadWestvaco Corporation, Stamford, CT (US)

( * ) Notice: Subject to any disclaimer, the term of this patent is extended or adjusted under 35 U.S.C. 154(b) by 24 days.

(21) Appl. No.: 10/324,173

(22) Filed: Dec. 20, 2002

(51) Int. Cl.$^7$ .............................................. B32B 27/00
(52) U.S. Cl. ...................... 428/500; 428/413; 428/522; 428/523; 428/507; 428/511; 524/501; 525/208; 525/217; 525/218
(58) Field of Search ................................. 525/217, 218, 525/208; 524/501; 428/413, 500, 522, 523

(56) References Cited

U.S. PATENT DOCUMENTS

| | | | |
|---|---|---|---|
| 3,412,054 A | 11/1968 | Milligan et al. | |
| 3,480,578 A | 11/1969 | Witt | |
| 3,716,389 A | 2/1973 | Voskuil et al. | |
| 3,770,486 A | 11/1973 | Hopermann | |
| 4,116,903 A | 9/1978 | Lietz et al. | |
| 4,205,143 A | * 5/1980 | Goodman | 525/213 |
| 4,317,755 A | 3/1982 | Gregory | |
| 4,414,370 A | 11/1983 | Hamielec et al. | |
| 4,460,637 A | 7/1984 | Miyamoto et al. | |
| 4,529,787 A | 7/1985 | Schmidt et al. | |
| 4,546,160 A | 10/1985 | Brand et al. | |
| 4,591,518 A | 5/1986 | Schillinger et al. | |
| 4,636,805 A | 1/1987 | Toganoh et al. | |
| 4,649,175 A | 3/1987 | Inoue et al. | |
| 4,812,508 A | 3/1989 | Makhlouf et al. | |
| 4,839,413 A | 6/1989 | Kiehlbauch et al. | |
| 4,916,182 A | * 4/1990 | Azzam | 524/501 |
| 5,008,329 A | 4/1991 | Abe et al. | |
| 5,096,959 A | 3/1992 | Jones et al. | |
| 5,116,945 A | 5/1992 | Osawa et al. | |
| 5,182,326 A | 1/1993 | LeBlanc et al. | |
| 5,216,064 A | 6/1993 | Rivera et al. | |
| 5,370,939 A | 12/1994 | Williams et al. | |
| 5,372,884 A | 12/1994 | Abe et al. | |
| 5,478,631 A | 12/1995 | Kawano et al. | |
| 5,521,229 A | 5/1996 | Lu et al. | |
| 5,656,679 A | 8/1997 | Hutter | |
| 5,948,546 A | 9/1999 | Bafford et al. | |
| 5,965,647 A | 10/1999 | Catena et al. | |
| 6,010,790 A | 1/2000 | Chen et al. | |
| 6,020,438 A | 2/2000 | Lubnin et al. | |
| 6,429,247 B1 | 8/2002 | Shah et al. | |
| 6,433,052 B1 | 8/2002 | Shah et al. | |
| 6,437,033 B1 | 8/2002 | Shah et al. | |
| 6,437,037 B1 | 8/2002 | Hutter | |

FOREIGN PATENT DOCUMENTS

EP 017199 10/1980

OTHER PUBLICATIONS

U.S. patent application Ser. No. 09/803829, filed Mar. 2002, Cationic Colloidal Dispersion Polymers for Ink Jet Coatings, G. F. Hutter and C. K. Stebbns.

U.S. patent application Ser. No. 10/214335, filed Aug. 2002, Stabilizer–Containing Caitionic Colloidal Dispersion Polymers for Ink Jet Coatings, G. F. Hutter, C. K. Stebbins and G. S. Samaranayake.

Huibers, P. Definitions. Online Available: http://surfactants-.net/microemulsion.htm. Oct. 10, 2002. 1+.

Rennie, A. R. Hypertext Guide to Terms in Colloid and Polymer Science. *King's College London, Department of Chemistry*. Online Available: http://www.ch.kcl.ac.uk/kclchem/staff/gloss.htm. Oct. 10, 2002. 1.

Sisson T. M., D. A. Teska and S. A. Fischer. Acrylic Polymer Emulsions For Adhesion To Low Energy Substrates. *American Ink Maker*. vol. 78, pp. 44–47 Aug. 2002.

U.S. patent application Ser. No. 09/854367, filed May 2001, Method for Releasing Laminated Materials, S. Zhang.

U.S. patent application Ser. No. 09/904224, filed Jul. 2001, Waterborne Polymer Compositions, C. A. Rumble et al.

* cited by examiner

Primary Examiner—David J. Buttner
Assistant Examiner—Christopher Keehan
(74) Attorney, Agent, or Firm—Daniel B. Reece, IV; Terry B. McDaniel

(57) ABSTRACT

This invention relates to polymer blend compositions and the process for preparing the same. In particular, the invention relates to novel blends of cationic polymers and anionic polymers which exhibit properties that make them useful as coatings for various substrates.

39 Claims, No Drawings

US 6,756,129 B1

POLYMER BLEND COMPOSITIONS

FIELD OF INVENTION

This invention relates to polymer blend compositions and the process for preparing the same. In particular, the invention relates to novel blends of cationic polymers and anionic polymers which exhibit properties that make them useful as coatings for various substrates.

BACKGROUND OF THE INVENTION

Ink jet printing is widely used to print on a variety of substrates (including paper, textiles, and plastics). These substrates are often coated with a material that enhances their receptivity for the ink jet ink. In the case of aqueous dye-based inks, which comprise the majority of inks currently used in ink jet printing, the property of dye fixation is particularly important. Most aqueous ink jet inks are based on dyes rather than pigments. To obtain sharp prints with high color density, the dye molecules must be immobilized almost immediately upon contact of the ink with the substrate. Penetration of the dyes into the substrate will result in reduced color density, while lateral migration of the dye molecules will cause indistinctness in the image formed.

The dyes that are commonly employed in aqueous ink jet inks are anionic in nature, containing sulfonic acid groups. Accordingly, dye fixation is generally accomplished by incorporating cationic polymers into the ink jet receptive coatings. These cationic polymers employ salt formation mechanisms to fix the dyes. The most widely used cationic dye fixative in ink jet receptive coatings is poly (diallyldimethylammonium chloride), although other water-soluble cationic polymers are known in the art. For example, U.S. Pat. No. 6,010,790 teaches the use of poly (vinylbenzylquaternary ammonium salts). Other examples of water-soluble cationic polymers are cationic starch, cationic polyvinyl alcohol, guanidine-formaldehyde resins, epichlorohydrin-polyamine condensates, and water-soluble cationic acrylic resins.

However, problems exist with the use of soluble or water-borne cationic polymers. For example, unless these polymers are cross-linked in some way, their presence often has a detrimental effect on the water resistance and chemical resistance of ink jet prints and other coatings. Also, as these cationic polymers are relatively expensive, their use in traditional packaging applications is limited. Furthermore, in many applications it is desirable to match the gloss of the coating to the appearance of the substrate. However, due to the glossy nature of most cationic polymers, it is often necessary to use gloss-modifying pigments to adjust the appearance of the finished coating. Also, the chemical nature of cationic polymers limits the materials available to modify the physical properties of the cationic-based coatings, in that many of the additives commonly used with anionic-based coatings would form precipitants or gels if employed with cationic-based coatings. Furthermore, as coatings produced with cationic polymers are normally transparent in nature, the color development of inks may be adversely effected by the color of the underlying substrate. Finally, cationic-based coatings are usually much slower to dry than anionic coatings. As most machinery used in coatings (e.g., flexographic printing presses, gravure printing presses, rod-coater, etc.) are designed for use with faster-drying anionic systems, the applicability of cationic-based coatings systems are limited.

Anionic polymers are normally added to a coating formulation in order to improve the chemical resistance, water resistance, and/or rub resistance of the coating. However, anionic polymers are not commonly employed in ink jet receptive coatings because, as most ink jet inks are composed of anionic dyes, an anionic ink jet receptive coating would not adequately fixate the dyes to the coated substrate.

It would be desirable to be able to produce a stable blend of cationic polymers and anionic polymers for use in various coating applications.

Therefore, an object of this invention is to disclose stable polymer blend compositions comprising mixtures of cationic polymer compositions and anionic polymer compositions.

Another object of this invention is to disclose polymer blend compositions which exhibit properties that allow them to be useful as coating formulations.

A further object of this invention is to disclose polymer blend compositions which exhibit properties that allow them to be useful in producing ink jet ink printing coating formulations.

SUMMARY OF THE INVENTION

The present invention achieves these objects and others via the production of polymer blend compositions that are stable mixtures of cationic polymer compositions and anionic polymer compositions. These novel blends minimize many of the problems involved in using either a cationic polymer composition or an anionic polymer composition in various coatings.

Skilled artisans would anticipate that the blending of cationic polymer compositions with anionic polymer compositions would not produce a stable polymer blend, as the negatively-charged particles and the positively-charged particles would tend to aggregate together to form a gel or to produce coagulum in the polymer solution. It was, therefore, unexpected that stable polymer blend compositions which exhibited no precipitate formation or gelling could be produced via the present method.

By way of explanation, but without limitation, this result may be caused by the employment of the particular cationic polymer compositions and anionic polymer compositions of the present invention. The free radical polymerization reaction utilized herein results in the production of cationic polymer compositions that contain at least one cationic functionality in the backbone of the polymer. The chemical characteristics of these cationic polymer compositions, coupled with the chemical characteristics and relatively low acid numbers of the anionic polymer compositions, may serve to retard the susceptibility of the respective polymers to react chemically.

Irrespective of the exact chemical mechanism, the ability to create stable water-borne polymer blend compositions which comprise a mixture of cationic polymers and anionic polymers allows the practitioner to produce compositions having chemical characteristics not easily obtained through the use of either cationic polymers or anionic polymers alone. For example, the employment of polymer blend compositions allows one to match the gloss of coatings to substrates, thereby improving the appearance of the printed finished product. Also, a stable polymer blend composition permits the utilization of a cationic polymer to modify an anionic coating system to produce desired coating viscosities without the loss of chemical resistance or other advantageous properties. Moreover, the ability to blend cationic polymer compositions with anionic polymer compositions allows one to produce a polymer blend coating compositions with desired drying rates. Finally, the broader versatility exhibited by the polymer blend ink jet receptive coating compositions of the present invention allows their employment in a variety of applications not commercially viable for traditional cationic ink jet receptive coatings.

DESCRIPTION OF THE PREFERRED EMBODIMENT

The polymer blend compositions of the present invention comprise, in admixture:

A) from about 1.0% to about 99.0% by weight of the composition of at least one cationic polymer composition produced by reacting in a free radical polymerization reaction a mixture comprising:
   1) about 6.0% to about 28.0% by total weight of the mixture of a member selected from the group consisting of amine-containing ethylenically unsaturated monomers, ethylenically unsaturated monomers containing at least one quaternary ammonium group, N-hydroxymethyl acrylamide, N-hydroxymethyl methacrylamide, N-hydroxymethyl-substituted acrylamide, N-hydroxymethyl-substituted methacrylamide, and combinations thereof;
   2) about 0.1% to about 40.0% by total weight of the mixture of a member selected from the group consisting of acrylic esters of alcohols containing from 1 to 22 carbon atoms, methacrylic esters of alcohols containing from 1 to 22 carbon atoms, styrene, substituted styrenes, acrylonitrile, methacrylonitrile, vinyl chloride, vinylidene chloride, vinyl ethers, vinyl esters, N-vinyl amides, and combinations thereof;
   3) about 3.0% to about 5.0% by total weight of the mixture of a member selected from the group consisting of cationic surfactants and combinations thereof;
   4) up to about 3.0% by total weight of the mixture of a member selected from the group consisting of non-ionic surfactants and combinations thereof;
   5) up to about 9.0% by total weight of the mixture of a member selected from the group consisting of ethylenically unsaturated monomers containing at least one hydroxyl group and combinations thereof;
   6) up to about 4.0% by total weight of the mixture of at least one chain transfer agent;
   7) a catalytic amount of polymerization initiator; and
   8) the balance of the mixture being water; to produce the cationic polymer composition having a solids content in the range of about 1.0% to about 50.0% and a pH in the range of about 3.5 to about 8.5; and B) from about 1.0 to about 99.0% by total weight of the composition of at least one anionic polymer composition produced by reacting in a free radical polymerization reaction a mixture comprising:
   1) about 20.0 to about 50.0% by total weight of the mixture of a member selected from the group consisting of vinylic monomers and combinations thereof;
   2) up to about 20.0% by total weight of the mixture of a member selected from the group consisting of water-dispersible polymers having an acid number of no greater than 250 and a weight average molecular weight in the range of about 4,000 to about 20,000 and combinations thereof;
   3) up to about 5.0% by total weight of the mixture of a member selected from the group consisting of epoxy monomers that contain at least two ethylene oxide groups, epoxy monomers that contain at least one ethylene oxide group and at least one epoxide group, and combinations thereof;
   4) up to about 5.0% by total weight of the mixture of a member selected from the group consisting of anionic surfactants, non-ionic surfactants, and combinations thereof;
   5) up to about 4.0% by total weight of the mixture of a member selected from the group consisting of chain transfer agents and combinations thereof;
   6) up to about 5.0% by total weight of the mixture of at least one organic solvent;
   7) a catalytic amount of polymerization initiator; and
   8) the balance of the mixture being water; to produce an anionic polymer composition having a solids content in the range of about 1.0% to about 50.0%, a pH in the range of about 3.5 to about 9.0, and an acid number of no greater than about 22; and wherein said polymer blend composition has an acid number no greater than about 22.

Preferred polymer blend compositions of the present invention comprise, in admixture:

A) from about 10.0% to about 90.0% by weight of the composition of at least one cationic polymer composition produced reacting in a free radical polymerization reaction a mixture comprising:
   1) about 10.0% to about 15.0% by total weight of the mixture of a member selected from the group consisting of amine-containing ethylenically unsaturated monomers, ethylenically unsaturated monomers containing at least one quaternary ammonium group, N-hydroxymethyl acrylamide, N-hydroxymethyl methacrylamide, N-hydroxymethyl-substituted acrylamide, N-hydroxymethyl-substituted methacrylamide, and combinations thereof;
   2) about 5.0% to about 20.0% by total weight of the mixture of a member selected from the group consisting of acrylic esters of alcohols containing from 1 to 22 carbon atoms, methacrylic esters of alcohols containing from 1 to 22 carbon atoms, styrene, substituted styrenes, acrylonitrile, methacrylonitrile, vinyl chloride, vinylidene chloride, vinyl ethers, vinyl esters, N-vinyl amides, and combinations thereof;
   3) about 4.0% to about 5.0% by total weight of the mixture of a member selected from the group consisting of cationic surfactants and combinations thereof;
   4) up to about 3.0% by total weight of the mixture of a member selected from the group consisting of non-ionic surfactants and combinations thereof;
   5) up to about 9.0% by total weight of the mixture of a member selected from the group consisting of ethylenically unsaturated monomers containing at least one hydroxyl group and combinations thereof;
   6) up to about 4.0% by total weight of the mixture of at least one chain transfer agent;
   7) a catalytic amount of polymerization initiator; and
   8) the balance of the mixture being water, to produce the cationic polymer composition having a solids content in the range of about 1.0% to about 50.0% and a pH in the range of about 3.5 to about 8.5; and B) from about 10.0% to about 90.0% by total weight of the composition of at least one anionic polymer composition produced by reacting in a free radical polymerization reaction a mixture comprising:
   1) about 35.0% to about 50.0% by total weight of the mixture of a member selected from the group consisting of vinylic monomers and combinations thereof;

2) about 5.0% to about 10.0% by total weight of the mixture of a member, selected from the group consisting of water-dispersible polymers having an acid number of no greater than 250 and a weight average molecular weight in the range of about 4,000 to about 20,000 and combinations thereof;

3) up to about 4.0% by total weight of the mixture of a member selected from the group consisting of epoxy monomers that contain at least two ethylene oxide groups, epoxy monomers that contain at least two epoxide groups, epoxy monomers that contain at least one ethylene oxide group and at least one epoxide group, and combinations thereof;

4) about 1.0% to about 3.0% by total weight of the mixture of a member selected from the group consisting of anionic surfactants, non-ionic surfactants, and combinations thereof;

5) up to about 4.0% by total weight of the mixture of a member selected from the group consisting of chain transfer agents and combinations thereof;

6) up to about 5.0% by total weight of the mixture of at least one organic solvent;

7) a catalytic amount of polymerization initiator; and 8) the balance of the mixture being water; to produce an anionic polymer composition having a solids content in the range of about 1.0% to about 50.0%, a pH in the range of about 3.5 to about 9.0, and an acid number of no greater than about 22; and wherein said polymer blend composition has an acid number no greater than about 22.

From about 1.0% to about 99.0% (preferably from about 10.0% to about 90.0%) by weight of the polymer blend composition of the present invention is composed of a cationic polymer composition or combination of cationic polymer compositions. Cationic polymer compositions which are suitable for use in the present invention are produced by reacting in a free radical polymerization reaction a mixture comprising:

1) about 6.0% to about 28.0% (preferably from about 10.0% to about 15.0%) by total weight of the mixture of a member selected from the group consisting of amine-containing ethylenically unsaturated monomers, ethylenically unsaturated monomers containing at least one quaternary ammonium group, N-hydroxymethyl acrylamide, N-hydroxymethyl methacrylamide, N-hydroxymethyl-substituted acrylamide, N-hydroxymethyl-substituted methacrylamide, and combinations thereof;

2) about 0.1% to about 40.0% (preferably from about 5.0% to about 20.0%) by total weight of the mixture of a member selected from the group consisting of acrylic esters of alcohols containing from 1 to 22 carbon atoms, methacrylic esters of alcohols containing from 1 to 22 carbon atoms, styrene, substituted styrenes, acrylonitrile, methacrylonitrile, vinyl chloride, vinylidene chloride, vinyl ethers, vinyl esters, N-vinyl amides, and combinations thereof;

3) about 3.0 to about 5.0% (preferably from about 4.0% to about 5.0%) by total weight of the mixture of a member selected from the group consisting of cationic surfactants and combinations thereof;

4) up to about 3.0% by total weight of the mixture of a member selected from the group consisting of non-ionic surfactants and combinations thereof;

5) up to about 9.0% by total weight of the mixture of a member selected from the group consisting of ethylenically unsaturated monomers containing at least one hydroxyl group and combinations thereof;

6) up to about 4.0% by total weight of the mixture of at least one chain transfer agent;

7) a catalytic amount of polymerization initiator; and 8) the balance of the mixture being water; to produce a the cationic polymer composition having a solids content in the range of about 1.0% to about 50.0% (preferably from about 35.0% to about 45.0%) and a pH in the range of about 3.5 to about 8.5 (preferably from about 4.5 to about 8.0).

Preferred amine-containing ethylenically unsaturated monomers suitable for use in the present invention, include, but are not limited to, the following: dimethylaminoethyl acrylate, dimethylaminoethyl methacrylate, diethylaminoethyl methacrylate, t-butylaminoethyl methacrylate, dimethylaminopropyl methacrylamide, allylamine, 2-vinylpyridine, 4-vinylpyridine, and combinations thereof.

Preferred ethylenically unsaturated monomers containing at least one quaternary ammonium group suitable for use in the present invention, include, but are not limited to, the following: hydroxyethyl acrylate, hydroxypropyl acrylate, hydroxybutyl acrylate, hydroxyethyl methacrylate, hydroxypropyl methacrylate, butanediol monovinyl ether, allyl alcohol, and combinations thereof.

Preferred cationic surfactants suitable for use in the present invention, include, but are not limited to, the following: alkyltrimethylammonium salts wherein the alkyl group contains from 8 to 22 carbon atoms and the counterion of the salt is a member selected from the group consisting of chloride, bromide, methylsulfate, and ethylsulfate; alkylbenzyldimethylammonium salts wherein the alkyl group contains from 8 to 22 carbon atoms and the counterion of the salt is a member selected from the group consisting of chloride, bromide, methylsulfate, and ethylsulfate; alkylpyridinium salts wherein the alkyl group contains from 8 to 22 carbon atoms and the counterion of the salt is a member selected from the group consisting of chloride, bromide, methylsulfate, and ethylsulfate; and combinations thereof.

Where desired, at least one nonionic surfactant may be added to the mixture undergoing free radical polymerization to produce the cationic polymer composition. Preferred nonionic surfactants suitable for use in the present invention, include, but are not limited to, the following: ethoxylated alkylphenols, ethoxylated fatty alcohols, ethylene oxide/propylene oxide block copolymers, and combinations thereof.

Where desired, at least one ethylenically unsaturated monomer containing at least one hydroxyl group may be added to the mixture undergoing free radical polymerization to produce the cationic polymer composition. Preferred ethylenically unsaturated monomers containing at least one hydroxyl group suitable for use in the present invention, include, but are not limited to, the following: hydroxyethyl acrylate, hydroxypropyl acrylate, hydroxybutyl acrylate, hydroxyethyl methacrylate, hydroxypropyl methacrylate, butanediol monovinyl ether, allyl alcohol, and combinations thereof.

Where desired, at least one chain transfer agent may be added to the mixture undergoing free radical polymerization to produce the cationic polymer composition. Preferred chain transfer agents suitable for use in the present invention, include, but are not limited to, the following: dodecyl mercaptan, 2-mercaptoethanol, alkyl mercaptopropionates, mercaptoacetic acid, mercaptopropionic acid, octyl mercaptan, and combinations thereof.

A catalytic amount of at least one polymerization initiator is used in the free radical polymerization reaction to produce the cationic polymer composition. The amount of initiator employed commonly comprises from about 0.1% to about 3.0% (preferably from about 0.2% to about 2.0%) by weight of the total mixture used to produce the cationic polymer composition. Traditional emulsion polymerization initiators (such as thermal initiators, redox initiators, and the like) are suitable for use in the free radical emulsion polymerization reaction. Examples of suitable thermal initiators include, but are not limited to, the following: hydrogen peroxide, t-butyl hydroperoxide, di-t-butyl peroxide, benzoyl peroxide, benzoyl hydroperoxide, 2,4-dichlorobenzoyl peroxide, t-butyl peracetate, azobisisobutyronitrile, isopropyl peroxycarbonate, and combinations thereof. Examples of suitable redox initiators include, but are not limited to, the following: cumene hydroperoxide-sodium metabisulfite, cumene hydroperoxide-iron (II) sulfate, and combinations thereof. Preferred initiators include water-soluble azo compounds (such as V-50 or VA-086 manufactured by Wako Chemicals).

Sufficient water is added to the mixture to produce a cationic polymer composition having a solids content in the range of about 1.0% to about 50.0%. The preferred solids content for the cationic polymer composition is in the range of about 35.0% to about 45.0%.

Cationic polymer compositions suitable for use in the present invention have a pH in the range of about 3.5 to about 8.5, preferably in the range from about 4.5 to about 8.0. Where desired, the pH of the cationic polymer composition may be adjusted via the addition or a member selected from the group consisting of mineral acids, water-soluble carboxylic acids, water-soluble sulfonic acids, and combinations thereof. Where employed, it is preferred to use at least one low molecular weight carboxylic acid such as acetic acid, propionic acid, glycolic acid, lactic acid, and the like.

From about 1.0% to about 99.0% (preferably from about 10.0% to about 90.0%) by weight of the polymer blend composition of the present invention is composed of an anionic polymer composition or combination of anionic polymer compositions. Anionic polymer compositions which are suitable for use in the present invention are produced by reacting in a free radical polymerization reaction a mixture comprising:

1) about 20.0% to about 50.0% (preferably from about 35.0% to about 50.0%) by total weight of the mixture of a member selected from the group consisting of vinylic monomers and combinations thereof;
2) up to about 20.0% (preferably from about 5.0% to about 10.0%) by total weight of the mixture of a member selected from the group consisting of water-dispersible polymers having an acid number of no greater than 250 (preferably in the range of about 180 to 250) and a weight average molecular weight in the range of about 4,000 to about 20,000 (preferably from about 5,000 to about 12,000) and combinations thereof;
3) up to about 5.0% (preferably up to about 4.0%) by total weight of the mixture of a member selected from the group consisting of epoxy monomers that contain at least two ethylene oxide groups, epoxy monomers that contain at least two epoxide groups, epoxy monomers that contain at least one ethylene oxide group and at least one epoxide group, and combinations thereof;
4) up to about 5.0% (preferably from about 1.0% to about 3.0%) by total weight of the mixture of a member selected from the group consisting of anionic surfactants, non-ionic surfactants, and combinations thereof;
5) up to about 4.0% by total weight of the mixture of a member selected from the group consisting of chain transfer agents and combinations thereof;
6) up to about 5.0% by total weight of the mixture of at least one organic solvent;
7) a catalytic amount of polymerization initiator; and
8) the balance of the mixture being water; to produce an anionic polymer composition having a solids content in the range of about 1.0% to about 50.0% (preferably in the range of about 35.0% to about 50.0%), a pH in the range of about 3.5 to about 9.0 (preferably in the range of about 8.0 to about 9.0), and an acid number of no greater than about 22 (preferably no greater than 10 and more preferably no greater than 5).

It is preferred that the vinylic monomer used in the free radical polymerization reaction to produce the anionic polymer composition be a member selected from the group consisting of styrenic monomers, acrylic monomers, methacrylic monomers, ethylenic monomers, and combinations thereof. It is further preferred that the vinylic monomer is a member selected from the group consisting of acrylic acid, methacrylic acid, methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate, benzyl methacrylate, allyl methacrylate, 2-n-butoxyethyl methacrylate, 2-chloroethyl methacrylate, sec-butyl-methacrylate, tert-butyl methacrylate, 2-ethybutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2 methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate, tetrahydropyranyl methacrylate, methyl acrylate, ethyl acrylate, n-propyl acrylate, isopropyl acrylate, n-butyl acrylate, n-decyl acrylate, 2-ethylhexal acrylate, salts of methacrylic acid, methacrylonitrile, methacrylamide, N-methylmethacrylamide, N-ethylmethacrylamide, N,N-diethymethacrylamide, N,N-dimethylmethacrylamide, N-phenyl-methacrylamide, methacrolein, salts of acrylic acid, acrylonitrile, acrylamide, methyl alpha-chloroacrylate, methyl 2-cyanoacrylate, N-ethylacrylamide, N,N-diethylacrylamide acrolein, vinyl acetate, vinyl chloride, vinyl pyridine, vinyl pyrollidone, sodium crotonate, methyl crotonate, crotonic acid, maleic anhydride, and combinations thereof.

Where desired, a water-dispersible polymer or combination of water-dispersible polymers may be added to the mixture undergoing free radical polymerization to produce the anioniopolymer composition. Water-dispersible polymers which are suitable for use in the present invention include those water-dispersible polymers having an acid number of no greater than 250 and a weight average molecular weight in the range of about 4,000 to about 20,000. It is preferred that the water-dispersible polymers have an acid number in the range of about 180 to 250. It is also preferred that the water-dispersible polymers have a weight average molecular weight in the range of about 4,000 to about 12,000. Water-dispersible polymers having an acid number of 100 or less can be utilized in the present invention without neutralization. However, polymers having an acid number of greater than 100 must be neutralized prior to dispersion in an aqueous medium. Aqueous bases suitable for use in neutralizing these polymers to produce water-dispersible polymers include organic and inorganic compounds (such as sodium hydroxide, potassium hydroxide, ammonium hydroxide, amines, sulfates, and the like). The term "water-dispersible polymers" as used herein includes polymers having an acid number of greater than 100 that have been neutralized for dispersion in an aqueous medium. Preferred water-dispersible stabilizing polymers include members selected from the group consisting of acrylic acid, methacrylic acid, fumaric acid, maleic anhydride, and combinations thereof. Polar, non-ionic water-dispersible polymers can also be employed in the present invention.

Where desired, an epoxy monomer or combination of epoxy monomers may be added to the mixture undergoing free radical polymerization to produce the anionic polymer composition. Epoxy monomers which are suitable for use in the present invention include epoxy monomers that contain at least two ethylene oxide groups, epoxy monomers that contain at least two epoxide groups, epoxy monomers that contain at least one ethylene oxide group and at least one epoxide group, and combinations thereof. Both water-soluble and water-insoluble epoxy monomers can be utilized in the present invention. Epoxy monomers which are preferred for use in the present invention include, but are not limited to, the following: aliphatic epoxidized urethanes, aromatic epoxidized urethanes, glycidyl acrylate esters, esters, siloxanes, aliphatic hydrocarbons, cyclic hydrocarbons, and combinations thereof.

Where desired, at least one anionic surfactant may be added to the mixture undergoing free radical polymerization to produce the anionic polymer composition. Preferred anionic surfactants suitable for use in the present invention, include, but are not limited to, the following: alkyl sulfates, ether sulfates, phosphate esters, sulfonates, and combinations thereof.

Where desired, at least one nonionic surfactant may be added to the mixture undergoing free radical polymerization to produce the anionic polymer composition. Preferred nonionic surfactants suitable for use in the present invention, include, but are not limited to, the following: ethoxylated alkylphenols, ethoxylated fatty alcohols, ethylene oxide/propylene oxide block copolymers, and combinations thereof.

Where desired, at least one chain transfer agent may be added to the mixture undergoing free radical polymerization to produce the anionic polymer composition. Preferred chain transfer agents suitable for use in the present invention, include, but are not limited to, the following: dodecyl mercaptan, 2-mercaptoethanol, alkyl mercaptopropionates, mercaptoacetic acid, mercaptopropionic acid, octyl mercaptan, and combinations thereof.

Where desired, at least one organic solvent may be added to the mixture undergoing free radical polymerization to produce the anionic polymer composition. Organic solvents that are suitable for use in the present invention include polar organic solvents, non-polar organic solvents, and combinations thereof. Examples of suitable organic solvents include aliphatic hydrocarbons, napththenic hydrocarbons, aromatic hydrocarbons, aliphatic monohydric alcohols, alicyclic monohydric alcohols, glycols; glycol ethers; ketones, esters, aldehydes, ethers, saturated fatty acids, unsaturated fatty acids, soya oils, tall oils, vegetable oils, spirits, amines, polyols, and the like.

A catalytic amount of at least one polymerization initiator is used in the free radical polymerization reaction to produce the anionic polymer composition. The amount of initiator employed commonly comprises from about 0.1% to about 3.0% (preferably from about 0.2% to about 2.0%) by weight of the total mixture used to produce the anionic polymer composition. Traditional emulsion polymerization initiators (such as thermal initiators, redox initiators, and the like) are suitable for use in the emulsion polymerization reaction. Examples of suitable thermal initiators include, but are not limited to, the following: hydrogen peroxide, t-butyl hydroperoxide, di-t-butyl peroxide, benzoyl peroxide, benzoyl hydroperoxide, 2,4-dichlorobenzoyl peroxide, t-butyl peracetate, azobisisobutyronitrile, isopropyl peroxycarbonate, and combinations thereof. Examples of suitable redox initiators include, but are not limited to, the following: cumene hydroperoxide-sodium metabisulfite, cumene hydroperoxide-iron (II) sulfate, and combinations thereof. Preferred initiators include water-soluble azo compounds (such as V-50 or VA-086 manufactured by Wako Chemicals).

Sufficient water is added to the mixture to produce an anionic polymer composition having a solids content in the range of about 1.0% to about 50.0%. The preferred solids content for the cationic emulsion polymerization product is in the range of about 35.0% to about 50.0%.

Anionic polymer compositions which are suitable for use in the present invention have a pH in the range of about 3.5 to about 9.0. It is preferred that the anionic polymer compositions have a pH in the range of about 8.0 to about 9.0.

Anionic polymer compositions which are suitable for use in the present invention have an acid number of no greater than about 22. It is preferred that the anionic polymer compositions have an acid number of no greater than about 10, and it is more preferred that the acid number be no greater than about 5.

The cationic polymer compositions and the anionic polymer compositions are mixed together to form the polymer blend compositions of the present invention. These polymer blend compositions have an acid number of no greater than about 22. It is preferred that the anionic polymer compositions have an acid number of no greater than about 10, and it is more preferred that the acid number be no greater than about 5.

The polymer blend compositions of the present invention are superior ink jet receptive coatings. Such ink jet receptive coatings can be employed to produce ink jet printable products via the process of coating a chosen substrate on at least one side with the ink jet receptive coating. Substrates which are suitable for use in producing such ink jet printable products include paper, paperboard, wood, plastics, metal foil, textiles, and the like. Where desired, any of the pigments traditionally used in ink jet receptive coatings can be employed in the coating. Such pigments include, but are not limited to, the following: silica, alumina, plastic pigments, calcium carbonate, kaolin clay, and combinations thereof.

The polymer blend compositions of the present invention also exhibit properties that make them useful as water-borne vehicles for various coatings, such as inks, varnishes, paints; functional coatings, and the like. Where desired, any of the pigments traditionally used in the formulation of such coatings can be employed in the coating provided that the pigments are compatible with the polymer blend compositions. Such pigments include, but are not limited to, the following: silica, alumina, plastic pigments, calcium carbonate, kaolin clay, organic based pigments, inorganic based pigments, and combinations thereof.

As appreciated in the art, the exact components and properties of components desired for any coating application can vary and, therefore, routine experimentation may be required to determine the optional components and proportions of components for a given application and desired properties.

The following examples are provided to further illustrate the present invention and are not to be construed as limiting the invention in any manner.

EXAMPLE 1

A cationic polymer composition suitable for use in producing a polymer blend composition was prepared as follows. A round bottom flask was equipped with a stirrer, thermometer, nitrogen inlet and reflux condenser. To the flask was added 427 g of deionized water (DIW), 32 g of ARQUAD C-50 (a 50% solution of dodecyltrimethylammonium chloride in isopropyl alcohol commercially available from Akzo Nobel), and 7.1 g of 3-methacyloylaminopropyl trimeammonium chloride (METAC), and the mixture was heated to a temperature of 140° F. A first monomer mixture (composed of 15 g of butyl acrylate, 2.4 g of dimethylaminoethylmethacrylate, and 23.4 g of styrene) was added to the flask. An initiator solution composed of 6.4 g of V-50 (an azo free radical initiator commercially available from Wako Chemicals) and 35 g of DIW was added to the flask and the temperature was maintained at 140° F. After 30 minutes, a second monomer mixture (composed of 25 g DIW and 41 g of METAC) and a third monomer mixture (composed of 84 g of butyl acrylate, 13.5 g of dimethylaminoethylmethacrylate, and 132 g of styrene) were added to the flask over a three-hour period. Upon completion of the feed, the reaction was heated to 160° F. and maintained at that temperature for 60 minutes. Upon cooling, the resulting cationic emulsion (hereafter "Cationic Polymer No. 1") contained a solids level of 37% and had a pH of 7.5.

EXAMPLE 2

A cationic polymer composition suitable for use in producing a polymer blend composition was prepared as follows. A round bottom flask was equipped with a stirrer, thermometer, nitrogen inlet and reflux condenser. To the flask was added 529 g of deionized water (DIW), 32 g of ARQUAD C-50 (a 50% solution of dodecyltrimethylammonium chloride in isopropyl alcohol commercially available from Akzo Nobel), and 5 g of 3-methacyloylaminopropyl trimeammonium chloride (METAC), and the mixture was heated to a temperature of 140° F. A first monomer mixture composed of 2.4 g of butyl acrylate, 14.6 g of dimethylaminoethylmethacrylate, 24.3 g of styrene, and 2.4 g of hydroxymethylmethacrylate) was added to the flask. Thereafter, an initiator solution composed of 6.6 g of V-50 (an azo free radical initiator commercially available from Wako Chemicals) and 16 g of DIW was added to the flask and the temperature was maintained at 140° F. After 30 minutes, 27 g of METAC and a second monomer mixture (composed of 14 g of butyl acrylate, 83 g of dimethylaminoethylmethacrylate, 138 g of styrene, and 14 g of hydroxymethylmethacrylate) were charged into the reaction over a three-hour period. Upon completion of the feed, the reaction was heated to 160° F. and maintained at that temperature for 60 minutes. Upon cooling, the resulting cationic emulsion (hereafter "Cationic Polymer No. 2") contained 40% solids and had a pH of 8.5.

EXAMPLE 3

A cationic polymer composition suitable for use in producing a polymer blend composition was prepared as follows. A round bottom flask was equipped with a stirrer, thermometer, nitrogen inlet and reflux condenser. To the flask was added 348 g of deionized water (DIW), 20 g of ARQUAD C-50 (a 50% solution of dodecyltrimethylammonium chloride in isopropyl alcohol commercially available from Akzo Nobel), and 3.4 g of TERGITOL NP-10 (a nonionic surfactant commercially available from Dow Chemical Co.), and the mixture was heated to a temperature of 140° F. Thereafter, a monomer mixture composed of 43 g of styrene and 27.8 g of 3-methacyloylaminopropyl trimeammonium chloride (METAC) was added to the flask. An initiator solution composed of 6.6 g of V-50 (an azo free radical initiator commercially available from Wako Chemicals) and 14 g of DIW was then added to the flask and the temperature was maintained at 140° F. After 30 minutes, a second monomer mixture (composed of 110 g of DIW, 2 g of ARQUAD C-50, and 243 g of styrene) and 43 g of METAC were added to the flask over a period of 180 minutes. Upon completion of the feed, the reaction was heated to 160° F. and maintained at that temperature for 60 minutes. Upon cooling, the resulting cationic emulsion (hereafter "Cationic Polymer No. 3") contained a solids level of 40% and had a pH of 4.0.

EXAMPLE 4

An anionic polymer composition suitable for use in producing a polymer blend composition was prepared as follows. A round bottom flask was equipped with a stirrer, thermometer, nitrogen inlet and reflux condenser. To the flask was added 296 g of deionized water (DIW), 0.5 g of sodium lauryl sulfate, and 0.7 g of itaconic acid, and the mixture was heated to 185° F. Thereafter, 13.6 g of styrene was added to the flask. An initiator solution composed of 0.2 g of ammonium persulfate and 8.2 g of DIW was then added to the flask and the temperature was maintained at 185° F. After 30 minutes, 355 g of styrene and an initiator mixture composed of 81 g of DIW, 3 g of ammonium persulfate, and 7.7 g of sodium lauryl sulfate were charged into the flask over a period of 200 minutes. Upon completion of the feed, the reaction was cooled to 160° F. and maintained at that temperature for 60 minutes. Upon cooling to 90° F., 26 g of IGEPAL CA-897 (a modified alkylphenol ethoxylate surfactant commercially available from Rhodia Chimie Corp.) was added to the flask. Upon cooling to room temperature, the resulting anionic emulsion (hereafter "Anionic Polymer No. 1") had a solids level of 48%, a pH of 8.4, and an acid number of less than 5.

EXAMPLE 5

An anionic polymer composition suitable for use in producing a polymer blend composition was prepared as follows. A round bottom flask was equipped with a stirrer, thermometer, nitrogen inlet and reflux condenser. To the flask was added 385 g of deionized water (DIW), 1 g of ammonium carbonate, and 1 g of RHODACAL DS-10 (sodium dodecylebenzene sulfonate commercially available from Rhodia Chimie Corp.), and the mixture was heated to 157° F. Thereafter, a monomer mixture composed of 2.7 g of EPON 828 (poly(bisphenol A-co-epicholorhydrin commercially available from Shell Oil Co. Corp.), 7.1 g of styrene, 2.1 g of ethyl acrylate, 1 g of CARBOWAX 350 (polyethylene glycol monomethylether commercially available from Dow Chemical Co.), and 1 g of methacrylic acid) was added to the flask. An initiator solution composed of 1 g of ammonium persulfate and 8.5 g of DIW was charged to the flask and the temperature was increased to 180° F. After 30 minutes, a monomer mixture composed of 16.4 g of EPON 828, 46.3 g of styrene, 13.2 g of ethyl acrylate, 6.6 g of CARBOWAX 350, and 6.6 g of methacrylic acid was charged into the flask over a period of 45 minutes. Upon completion of the feed, the reaction was heated to 180° F. After 60 minutes, a monomer mixture (composed of 34.5 g of butyl acrylate, 51 g of butyl methacrylate, 120 g of methyl methacrylate, and 80 g of 2-ethylhexyl acrylate) and an initiator mixture composed of 47.5 g DIW, 5.4 g Aerosol NPES 930P (a sulfated ethoxylated nonyl phenol ammonium salt commercially available from Cytec), 5.4 g of RHODAPEX CO-436 (a modified alkylphenol ethoxylate surfactant commercially available from Rhodia Chimie Corp.), and 4.6 g of ammonium persulfate were added to the flask over a two-hour period. Upon cooling, the resulting anionic emulsion (hereafter "Anionic Polymer No. 2") had a solids content of 42%, a pH of 4.5, and an acid number in the range of 5 to 10.

EXAMPLE 6

An anionic polymer composition suitable for use in producing a polymer blend composition was prepared as follows. A round bottom flask was equipped with a stirrer, thermometer, nitrogen inlet and reflux condenser. To the flask was added 775 g of deionized water (DIW), 34 g of PLURONIC L-61 (polyoxyethylene-polyoxypropylene glycol commercially available from BASF Corp.), 1.7 g of RHODAPEX CO-436 (a modified alkylphenol ethoxylate surfactant commercially available from Rhodia Chimie Corp.), 132 g of a styrene acrylate methacrylic acid co-polymer ammonium salt water-dispersible polymer, 21.5 g of methacrylic acid, and 25 g of ammonium hydroxide, and the mixture was heated to 172° F. Thereafter, a monomer mixture composed of 5.5 g of butyl acrylate and 103 g of styrene was charged into the flask. An initiator solution composed of 6.8 g of ammonium persulfate and 26 g of DIW was then added to the flask and the temperature was increased to 180° F. After 30 minutes, a second monomer mixture composed of 37 g of butyl acrylate, and 694 g of styrene was charged into the flask over a period of 180 minutes. An initiator mixture composed of 35 g DIW and 2.2 g of ammonium persulfate was also added to the reaction 90 minutes after the start of the charging of the second monomer mixture into the flask. Upon completion of the feed, the reaction was heated to 180° F. After a period of 60 minutes, the reaction was cooled to 90° F. and a surfactant mixture composed of 61 g of IGEPAL CA-897 (a modified alkylphenol ethoxylate surfactant commercially available from Rhodia Chimie Corp.) and 24 g of DIW was charged into the reaction. Upon cooling to room temperature, the resulting anionic emulsion (hereafter "Anionic Polymer No. 3") had a solids level of 49%, a pH of 8.8, and an acid number of less than 22.

EXAMPLE 7

A cationic polymer composition suitable for use in producing a polymer blend composition was prepared as follows. A round bottom flask was equipped with a stirrer, thermometer, nitrogen inlet and reflux condenser. To the flask was added 314 g of deionized water (DIW), 27 g of ARQUAD C-50 (a 50% solution of dodecyltrimethylammonium chloride in isopropyl alcohol commercially available from Akzo Nobel), and 4 g of 3-methacyloylaminopropyl trimeammonium chloride (METAC), and the mixture was heated to a temperature of 140° F. A monomer mixture composed of 2 g of butyl acrylate, 12 g of dimethylaminoethylmethacrylate, and 22 g of styrene was added to the flask. Thereafter, an initiator solution composed of 5.5 g of V-50 (an azo free radical initiator commercially available from Wako Chemicals) and 32 g of DIW was added to the flask and the temperature was maintained at 140° F. After 30 minutes, a first mixture (comprised of 23 g of METAC and 29 g of DIW) and a second monomer mixture (composed of 11 g of butyl acrylate, 67 g of dimethylaminoethylmethacrylate, and 126 g of styrene) were charged into the reaction over a period of 180 minutes. Upon completion of the feed, the reaction was heated to 160° F. and maintained at that temperature for 60 minutes. Upon cooling, the resulting cationic emulsion (hereafter "Cationic Polymer No. 4") contained 40% solids and had a pH of 8.5.

EXAMPLE 8

A polymer blend composition was prepared as follows. To a 4 oz jar was added 25 g of Cationic Polymer No. 1. Thereafter, 75 g of Anionic Polymer No. 1 was added to the jar with stirring, and the blend was mixed for an additional two minutes using a standard lab mixer. The resulting polymer blend composition, which had a viscosity of 20 seconds as measured via a Zahn 2 cup, was stable and exhibited no precipitate formation or gelling.

EXAMPLE 9

A polymer blend composition was prepared as follows. To a 4 oz jar was added 50 g of Anionic Polymer No. 1. Thereafter, 50 g of Cationic Polymer No. 1 was added to the jar with stirring, and the blend was mixed for an additional two minutes using a standard lab mixer. The resulting polymer blend composition, which had a viscosity of 20 seconds as measured via a Zahn 2 cup, was stable and exhibited no precipitate formation or gelling.

EXAMPLE 10

A polymer blend composition was prepared as follows. To a 4 oz jar was added 75 g of Cationic Polymer No. 1. Thereafter, 25 g of Anionic Polymer No. 1 was added to the jar with stirring, and the blend was mixed for an additional two minutes using a standard lab mixer. The resulting polymer blend composition, which had a viscosity of 20.8 seconds as measured via a Zahn 2 cup, was stable and exhibited no precipitate formation or gelling.

EXAMPLE 11

A polymer blend composition was prepared as follows. To a 4 oz jar was added 80 g of Cationic Polymer No. 1. Thereafter, 20 g of Anionic Polymer No. 5 was added to the jar with stirring, and the blend was mixed for an additional two minutes using a standard lab mixer. The resulting polymer blend composition, which had a viscosity of 22.2 seconds as measured via a Zahn 2 cup and a pH of 7.5, was stable and exhibited no precipitate formation or gelling.

EXAMPLE 12

A polymer blend composition was prepared as follows. To a 4 oz jar was added 10 g of Anionic Polymer No. 1. Thereafter, 90 g of Cationic Polymer No. 5 was added to the jar with stirring, and the blend was mixed for an additional two minutes using a standard lab mixer. The resulting polymer blend composition, which had a viscosity of 60 seconds as measured via a Zahn 2 cup and a pH of 8.0, was stable and exhibited no precipitate formation or gelling.

EXAMPLE 13

A polymer blend composition was prepared as follows. To a 4 oz jar was added 90 g of Cationic Polymer No. 3. Thereafter, 10 g of Anionic Polymer No. 5 was added to the jar with stirring, and the blend was mixed for an additional two minutes using a standard lab mixer. The resulting polymer blend composition, which had a viscosity of 20 seconds as measured via a Zahn 2 cup and a pH of 5.08, was stable and exhibited no precipitate formation or gelling.

EXAMPLE 14

A polymer blend composition was prepared as follows. To a 4 oz jar was added 81.0 g of Cationic Polymer No. 2. Thereafter, 9.0 g of Anionic Polymer No. 2 was added to the jar with stirring, and the blend was mixed for an additional two minutes using a standard lab mixer. The resulting polymer blend composition was stable and exhibited no precipitate formation or gelling.

A non-pigmented coating was prepared by mixing together for two minutes the polymer blend composition, 5.0 g of deionized water, 0.1 g of Dow 62 (a silicon defoamer emulsion commercially available from Dow Corning), 4.0 g of 392N35 (a 35% solids polyethylene was commercially available from Chemcor) and 0.9 g of BYK 302 (a polyether-modified dimethyl polysiloxane copolymer commercially available from BYK Chemie GMBH Corp.). The resulting polymer blend coating had a viscosity of 45 seconds as measured via a Zahn 2 cup and a pH of 7.5.

For comparison purposes, a non-pigmented coating was made using the above-noted procedure except that the polymer blend composition was replaced with 90 g of Anionic Polymer No. 2.

The polymer blend coating and the coatings of the comparative examples were each applied to C1S paperboard using a No. 12 wire-wound rod. The coated sheets were then oven dried for 30 seconds at 60° C. and allowed to dry overnight at room temperature. The sheets were subsequently tested via a standard spot test for periods of 2, 10, 30, and 60 minutes using the following chemical reagents: FORMULA 409 PRO (a commercial cleaner from Clorox Co.), 0.3% ammonium hydroxide, 70% isopropyl alcohol, 50% ethanol, and 0.5 molar potassium hydroxide. The sheets coated with the polymer blend coating exhibited superior chemical resistances when compared to the comparative example coating.

EXAMPLE 15

A polymer blend composition was prepared as follows. To a 4 oz jar was added 58.5 g of Cationic Polymer No. 2. Thereafter, 6.5 g of Anionic Polymer No. 2 was added to the jar with stirring, and the blend was mixed for an additional two minutes using a standard lab mixer. The resulting polymer blend composition was stable and exhibited no precipitate formation or gelling.

A pigmented coating was prepared by mixing together for two minutes the polymer blend composition, 5.0 g of deionized water, and 30.0 g of BHD-6000 (a blue pigment resinless dispersion commercially available from Sun Chemical). The resulting polymer blend coating had a viscosity of 25 seconds as measured via a Zahn 2 cup and a pH of 7.5.

For comparison purposes, a pigmented coating was made using the above-noted procedure except that the polymer blend composition was replaced with either 65 g of Anionic Polymer No. 2.

The polymer blend coating and the coatings of the comparative examples were each applied to C1S paperboard using a No. 12 wire-wound rod. The coated sheets were then oven dried for 30 seconds at 60° C. and allowed to dry overnight at room temperature. The sheets were subsequently tested via a standard spot test for periods of 2, 10, 30, and 60 minutes using the following chemical reagents: FORMULA 409 PRO (a commercial cleaner from Clorox Co.), 0.3% ammonium hydroxide, 70% isopropyl alcohol, 50% ethanol, and 0.5 molar potassium hydroxide. The sheets coated with the polymer blend coating exhibited superior chemical resistances when compared to the comparative example coating.

EXAMPLE 16

A polymer blend composition was prepared as follows. To a 4 oz jar was added 76.9 g of Cationic Polymer No. 1. Thereafter, 20.0 g of Anionic Polymer No. 1 was added to the jar with stirring, and the blend was mixed for an additional two minutes using a standard lab mixer. The resulting polymer blend composition was stable and exhibited no precipitate formation or gelling.

An ink jet receptive coating was prepared by mixing together for two minutes the polymer blend composition, 0.1 g of Dow 62 (a silicone antifoam emulsion commercially available from Dow Coming) and 3.0 g of 392N35 (a 35% solids polyethylene was commercially available from Chemcor). The resulting polymer blend ink jet receptive coating had a viscosity of 100 cps as measured by a #4 spindle at 100 rpms and a pH of 8.39.

A traditional polyvinyl alcohol-based ink jet receptive coating was also produced as a comparative example. The above procedure was repeated except that the polymer blend composition was replaced with a 30 g of AIRVOL 205 (a polyvinyl alcohol manufactured by Air Products, Inc.) mixed in 70 g of DIW.

The polymer blend ink jet receptive coating and the coating of the comparative example were each applied to Hammermill Multipurpose paper using a No. 12 wire-wound rod. The coated sheets were then dried for 5 minutes at 110° C., and test prints were made on the dried sheets with black ink using an Epson 900 printer. The print made on the coating produced with the blend polymer of the present invention showed much sharper definition, increased edge acuity, greater water-resistance, and a higher color density when compared with the print produced using the traditional polyvinyl alcohol-based ink jet receptive coating.

EXAMPLE 17

A polymer blend composition was prepared as follows. To a 4 oz jar was added 25 g of Cationic Polymer No. 1. Thereafter, 75 g of Anionic Polymer No. 6 was added to the jar with stirring, and the blend was mixed for an additional two minutes using a standard lab mixer. The resulting polymer blend composition, which had a viscosity of 23 seconds as measured via a Zahn 2 cup, was stable and exhibited no precipitate formation or gelling.

EXAMPLE 18

A polymer blend composition was prepared as follows. To a 4 oz jar was added 75 g of Cationic Polymer No. 1. Thereafter, 25 g of Anionic Polymer No. 6 was added to the jar with stirring, and the blend was mixed for an additional two minutes using a standard lab mixer. The resulting polymer blend composition, which had a viscosity of 27 seconds as measured via a Zahn 2 cup, was stable and exhibited no precipitate formation or gelling.

EXAMPLE 19

A polymer blend composition was prepared as follows. To a 4 oz jar was added 50 g of Anionic Polymer No. 6. Thereafter, 50 g of Cationic Polymer No. 2 was added to the jar with stirring, and the blend was mixed for an additional two minutes using a standard lab mixer. The resulting polymer blend composition, which had a viscosity of 23 seconds as measured via a Zahn 2 cup, was stable and exhibited no precipitate formation or gelling.

EXAMPLE 20

A polymer blend composition was prepared as follows. To a 4 oz jar was added 25 g of Anionic Polymer No. 6. Thereafter, 75 g of Cationic Polymer No. 2 was added to the jar with stirring, and the blend was mixed for an additional two minutes using a standard lab mixer. The resulting polymer blend composition, which had a viscosity of 27 seconds as measured via a Zahn 2 cup, was stable and exhibited no precipitate formation or gelling.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. A polymer blend composition comprising, in admixture:
   A) from about 1.0 to about 99.0% by weight of the composition of at least one cationic polymer composition produced by reacting in a free radical polymerization reaction a mixture comprising:
      1) about 6.0 to about 28.0% by total weight of the mixture of a member selected from the group consisting of amine-containing ethylenically unsaturated monomers, ethylenically unsaturated monomers containing at least one quaternary ammonium group, N-hydroxymethyl acrylamide, N-hydroxymethyl methacrylamide, N-hydroxymethyl-substituted acrylamide, N-hydroxymethyl-substituted methacrylamide, and combinations thereof;
      2) about 0.1 to about 40.0% by total weight of the mixture of a member selected from the group consisting of acrylic esters of alcohols containing from 1 to 22 carbon atoms, methacrylic esters of alcohols containing from 1 to 22 carbon atoms, styrene, substituted styrenes, acrylonitrile, methacrylonitrile, vinyl chloride, vinylidene chloride, vinyl ethers, vinyl esters, N-vinyl amides, and combinations thereof;
      3) about 3.0 to about 5.0% by total weight of the mixture of a member selected from the group consisting of cationic surfactants and combinations thereof;
      4) up to about 3.0% by total weight of the mixture of a member selected from the group consisting of non-ionic surfactants and combinations thereof;
      5) up to about 9.0% by total weight of the mixture of a member selected from the group consisting of ethylenically unsaturated monomers containing at least one hydroxyl group and combinations thereof;
      6) up to about 4.0% by total weight of the mixture of at least one chain transfer agent;
      7) a catalytic amount of polymerization initiator; and
      8) the balance of the mixture being water; to produce the cationic polymer composition having a solids content in the range of about 1.0% to about 50.0% and a pH in the range of about 3.5 to about 8.5; and
   B) from about 1.0 to about 99.0% by total weight of the composition of at least one anionic polymer composition produced by reacting in a free radical polymerization reaction a mixture comprising:
      1) about 20.0 to about 50.0% by total weight of the mixture of a member selected from the group consisting of vinylic monomers and combinations thereof;
      2) up to about 20.0% by total weight of the mixture of a member selected from the group consisting of water-dispersible polymers having an acid number of no greater than 250 and a weight average molecular weight in the range of about 4,000 to about 20,000 and combinations thereof;
      3) up to about 5.0% by total weight of the mixture of a member selected from the group consisting of epoxy monomers that contain at least two ethylene oxide groups, epoxy monomers that contain at least two epoxide groups, epoxy monomers that contain at least one ethylene oxide group and at least one epoxide group, and combinations thereof;
      4) up to about 5.0% by total weight of the mixture of a member selected from the group consisting of anionic surfactants, non-ionic surfactants, and combinations thereof;
      5) up to about 4.0% by total weight of the mixture of a member selected from the group consisting of chain transfer agents and combinations thereof;
      6) up to about 5.0% by total weight of the mixture of at least one organic solvent;
      7) a catalytic amount of polymerization initiator; and
      8) the balance of the mixture being water; to produce an anionic polymer composition having a solids content in the range of about 1.0% to about 50.0%, a pH in the range of about 3.5 to about 9.0, and an acid number of no greater than about 22; and wherein said polymer blend composition has an acid number no greater than about 22.

2. The polymer blend composition of claim 1 which comprises, in admixture:
   A) from about 10.0 to about 90.0% by weight of the composition of at least one cationic polymer composition produced reacting in a free radical polymerization reaction a mixture comprising:
      1) about 10.0% to about 15.0% by total weight of the mixture of a member selected from the group consisting of amine-containing ethylenically unsaturated monomers, ethylenically unsaturated monomers containing at least one quaternary ammonium group, N-hydroxymethyl acrylamide, N-hydroxymethyl methacrylamide, N-hydroxymethyl-substituted acrylamide, N-hydroxymethyl-substituted methacrylamide, and combinations thereof;
      2) about 5.0% to about 20.0% by total weight of the mixture of a member selected from the group consisting of acrylic esters of alcohols containing from 1 to 22 carbon atoms, methacrylic esters of alcohols containing from 1 to 22 carbon atoms, styrene, substituted styrenes, acrylonitrile, methacrylonitrile, vinyl chloride, vinylidene chloride, vinyl ethers, vinyl esters, N-vinyl amides, and combinations thereof;

3) about 4.0% to about 5.0% by total weight of the mixture of a member selected from the group consisting of cationic surfactants and combinations thereof;
4) up to about 3.0% by total weight of the mixture of a member selected from the group consisting of non-ionic surfactants and combinations thereof;
5) up to about 9.0% by total weight of the mixture of a member selected from the group consisting of ethylenically unsaturated monomers containing at least one hydroxyl group and combinations thereof;
6) up to about 4.0% by total weight of the mixture of at least one chain transfer agent;
7) a catalytic amount of polymerization initiator; and
8) the balance of the mixture being water; to produce the cationic polymer composition having a solids content in the range of about 1.0% to about 50.0% and a pH in the range of about 3.5 to about 8.5; and B) from about 10.0% to about 90.0% by total weight of the composition of at least one anionic polymer composition produced by reacting in a free radical polymerization reaction a mixture comprising:
1) about 35.0% to about 50.0% by total weight of the mixture of a member selected from the group consisting of vinylic monomers and combinations thereof;
2) about 5.0% to about 10.0% by total weight of the mixture of a member selected from the group consisting of water-dispersible polymers having an acid number of no greater than 250 and a weight average molecular weight in the range of about 4,000 to about 20,000 and combinations thereof;
3) up to about 4.0% by total weight of the mixture of a member selected from the group consisting of epoxy monomers that contain at least two ethylene oxide groups, epoxy monomers that contain at least two epoxide groups, epoxy monomers that contain at least one ethylene oxide group and at least one epoxide group, and combinations thereof;
4) about 1.0% to about 3.0% by total weight of the mixture of a member selected from the group consisting of anionic surfactants, non-ionic surfactants, and combinations thereof;
5) up to about 4.0% by total weight of the mixture of a member selected from the group consisting of chain transfer agents and combinations thereof;
6) up to about 5.0% by total weight of the mixture of at least one organic solvent;
7) a catalytic amount of polymerization initiator; and
8) the balance of the mixture being water; to produce an anionic polymer composition having a solids content in the range of about 1.0% to about 50.0%, a pH in the range of about 3.5 to about 9.0, and an acid number of no greater than about 22; and wherein said polymer blend composition has an acid number no greater than about 22.

3. The polymer blend composition of claim 1 wherein the amine-containing ethylenically unsaturated monomer is a member selected from the group consisting of dimethylaminoethyl acrylate, dimethylaminoethyl methacrylate, diethylaminoethyl methacrylate, t-butylaminoethyl methacrylate, dimethylaminopropyl methacrylamide, allylamine, 2-vinylpyridine, 4-vinylpyridine, and combinations thereof.

4. The polymer blend composition of claim 1 wherein the ethylenically unsaturated monomer containing at least one quaternary ammonium group is a member selected from the group consisting of hydroxyethyl acrylate, hydroxypropyl acrylate, hydroxybutyl acrylate, hydroxyethyl methacrylate, hydroxypropyl methacrylate, butanediol monovinyl ether, allyl alcohol, and combinations thereof.

5. The polymer blend composition of claim 1 wherein the cationic surfactant is a member selected from the group consisting of alkyltrimethylammonium salts wherein the alkyl group contains from 8 to 22 carbon atoms and the counterion of the salt is a member selected from the group consisting of chloride, bromide, methylsulfate, and ethylsulfate; alkylbenzyldimethylammonium salts wherein the alkyl group contains from 8 to 22 carbon atoms and the counterion of the salt is a member selected from the group consisting of chloride, bromide, methylsulfate, and ethylsulfate; alkylpyridinium salts wherein the alkyl group contains from 8 to 22 carbon atoms and the counterion of the salt is a member selected from the group consisting of chloride, bromide, methylsulfate, and ethylsulfate; and combinations thereof.

6. The polymer blend composition of claim 1 wherein the nonionic surfactant in the mixture reacted to produce the cationic polymer composition is a member selected from the group consisting of ethoxylated alkylphenols, ethoxylated fatty alcohols, ethylene oxide/propylene oxide block copolymers, and combinations thereof.

7. The polymer blend composition of claim 1 wherein the ethylenically unsaturated monomer containing at least one hydroxyl group is a member selected from the group consisting of hydroxyethyl acrylate, hydroxypropyl acrylate, hydroxybutyl acrylate, hydroxyethyl methacrylate, hydroxypropyl methacrylate, butanediol monovinyl ether, allyl alcohol, and combinations thereof.

8. The polymer blend composition of claim 1 wherein the chain transfer agent in the mixture reacted to produce the cationic polymer composition is a member selected from the group consisting of dodecyl mercaptan, 2-mercaptoethanol, alkyl mercaptopropionates, mercaptoacetic acid, mercaptopropionic acid, octyl mercaptan, and combinations thereof.

9. The polymer blend composition of claim 1 wherein the polymerization initiator in the mixture reacted to produce the cationic polymer composition comprises from about 0.1% to about 3.0% by total weight of the mixture reacted to produce the cationic polymer composition and is a member selected from the group consisting of thermal initiators, redox initiators, and combinations thereof.

10. The polymer blend composition of claim 9 wherein the thermal initiator is a member selected from the group consisting of hydrogen peroxide, t-butyl hydroperoxide, di-t-butyl peroxide, benzoyl peroxide, benzoyl hydroperoxide, 2,4-dichlorobenzoyl peroxide, t-butyl peracetate, azobisisobutyronitrile, isopropyl peroxycarbonate, and combinations thereof.

11. The polymer blend composition of claim 9 wherein the redox initiator is a member selected from the group consisting of cumene hydroperoxide-sodium metabisulfite, cumene hydroperoxide-iron (II) sulfate, and combinations thereof.

12. The polymer blend composition of claim 1 wherein the cationic polymer composition has a solids content in the range of about 35.0% to about 45.0%.

13. The polymer blend composition of claim 1 wherein the cationic polymer composition has a pH in the range of about 4.5 to about 8.0.

14. The polymer blend composition of claim 1 wherein the vinylic monomer is a member selected from the group consisting of styrenic monomers, acrylic monomers, methacrylic monomers, ethylenic monomers, and combinations thereof.

15. The polymer blend composition of claim 14 wherein the vinylic monomer is a member selected from the group consisting of acrylic acid, methacrylic acid, methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate, benzyl methacrylate, allyl methacrylate, 2-n-butoxyethyl methacrylate, 2-chloroethyl methacrylate, sec-butyl-methacrylate, tert-butyl methacrylate, 2-ethybutyl methacrylate, cinnamyl methacrylate, crotyl methacrylate, cyclohexyl methacrylate, cyclopentyl methacrylate, 2-ethoxyethyl methacrylate, furfulryl methacrylate, hexafluoroisopropyl methacrylate, methallyl methacrylate, 3-methoxybutyl methacrylate, 2-methoxybutyl methacrylate, 2-nitro-2 methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate, tetrahydropyranyl methacrylate, methyl acrylate, ethyl acrylate, n-propyl acrylate, isopropyl acrylate, n-butyl acrylate, n-decyl acrylate, 2-ethylhexal acrylate, salts of methacrylic acid, methacrylonitrile, methacrylamide, N-methylmethacrylamide, N-ethylmethacrylamide, N,N-diethymethacrylamide, N,N-dimethylmethacrylamide, N-phenyl-methacrylamide, methacrolein, salts of acrylic acid, acrylonitrile, acrylamide, methyl alpha-chloroacrylate, methyl 2-cyanoacrylate, N-ethylacrylamide, N,N-diethylacrylamide acrolein, vinyl acetate, vinyl chloride, vinyl pyridine, vinyl pyrollidone, sodium crotonate, methyl crotonate, crotonic acid, maleic anhydride, and combinations thereof.

16. The polymer blend composition of claim 1 wherein the water-dispersible polymer is a member selected from the group consisting of acrylic acid, methacrylic acid, fumaric acid, maleic anhydride and combinations thereof.

17. The polymer blend composition of claim 1 wherein the water-dispersible polymer has a weight average molecular weight in the range of about 5,000 to about 12,000.

18. The polymer blend composition of claim 1 wherein the water-dispersible polymer has an acid number in the range of about 180 to 250.

19. The polymer blend composition of claim 1 wherein the epoxy monomer is a member selected from the group consisting of aliphatic epoxidized urethanes, aromatic epoxidized urethanes, glycidyl acrylate esters, esters, siloxanes, aliphatic hydrocarbons, cyclic hydrocarbons, and combinations thereof.

20. The polymer blend composition of claim 1 wherein the anionic surfactant is a member selected from the group consisting of alkyl sulfates, ether sulfates, phosphate esters, sulfonates, and combinations thereof.

21. The polymer blend composition of claim 1 wherein the nonionic surfactant in the mixture reacted to produce the anionic polymer composition is a member selected from the group consisting of ethoxylated alkylphenols, ethoxylated fatty alcohols, ethylene oxide/propylene oxide block copolymers, and combinations thereof.

22. The polymer blend composition of claim 1 wherein the chain transfer agent in the mixture reacted to produce the anionic polymer composition is a member selected from the group consisting of dodecyl mercaptan, 2-mercaptoethanol, alkyl mercaptopropionates, mercaptoacetic acid, mercaptopropionic acid, octyl mercaptan, and combinations thereof.

23. The polymer blend composition of claim 1 wherein the polymerization initiator in the mixture reacted to produce the anionic polymer composition comprises from about 0.1% to about 3.0% by total weight of the mixture reacted to produce the anionic polymer composition and is a member selected from the group consisting of thermal initiators, redox initiators, and combinations thereof.

24. The polymer blend composition of claim 23 wherein the thermal initiator is a member selected from the group consisting of hydrogen peroxide, t-butyl hydroperoxide, di-t-butyl peroxide, benzoyl peroxide, benzoyl hydroperoxide, 2,4-dichlorobenzoyl peroxide, t-butyl peracetate, azobisisobutyronitrile, isopropyl peroxycarbonate, and combinations thereof.

25. The polymer blend composition of claim 23 wherein the redox initiator is a member selected from the group consisting of cumene hydroperoxide-sodium metabisulfite, cumene hydroperoxide-iron (II) sulfate, and combinations thereof.

26. The polymer blend composition of claim 1 wherein the anionic polymer composition has a solids content in the range of about 35.0% to about 50.0%.

27. The polymer blend composition of claim 1 wherein the anionic polymer composition has a pH in the range of about 8.0 to about 9.0.

28. The polymer blend composition of claim 1 wherein the anionic polymer composition has an acid number no greater than about 10.

29. The polymer blend composition of claim 1 wherein the anionic polymer composition has an acid number no greater than about 5.

30. The polymer blend composition of claim 1 wherein said composition has an acid number no greater than about 10.

31. The polymer blend composition of claim 1 wherein said composition has an acid number no greater than about 5.

32. An ink jet receptive coating comprising the polymer blend composition of claim 1.

33. The ink jet receptive coating of claim 32 wherein the coating further comprises a pigment.

34. The ink jet receptive coating of claim 33 Wherein the pigment is a member selected from the group consisting of silica, alumina, plastic pigments, calcium carbonate, kaolin clay, and combinations thereof.

35. An ink jet printable product comprising a substrate coated on at least one side with the coating of claim 32.

36. The ink jet printable product of claim 35 where the substrate is a member selected from the group consisting of paper, paperboard, wood, plastics, metal foil, textiles, and combinations thereof.

37. A coating comprising the polymer blend composition of claim 1.

38. The coating of claim 37 wherein the coating further comprises a pigment.

39. The coating of claim 38 wherein the pigment is a member selected from the group consisting of silica, alumina, plastic pigments, calcium carbonate, kaolin clay, organic based pigments, inorganic based pigments, and combinations thereof.

* * * * *